UNITED STATES PATENT OFFICE.

WILLIAM O. EMERY, OF CRAWFORDSVILLE, INDIANA.

METHOD OF AGING PORTLAND CEMENT.

No. 806,788.   Specification of Letters Patent.   Patented Dec. 12, 1905.

Application filed December 18, 1903. Serial No. 185,689.

*To all whom it may concern:*

Be it known that I, WILLIAM O. EMERY, a citizen of the United States, residing at Crawfordsville, in the county of Montgomery and State of Indiana, have invented a new and useful Method of Aging Portland Cement, of which the following is a specification.

This invention relates to an improvement in the art of manufacturing Portland cement.

The improvement is intended to provide a continuous and simple way for aging or maturing Portland cement, so that as rapidly as the cement is manufactured it may be placed at once upon the market in condition suitable for immediate use.

To this end this invention consists of a method of treating Portland cement so as to thoroughly carbonate all free quicklime which may be contained therein.

The method of aging Portland cement practiced according to this invention consists, essentially, of two distinct steps or treatments. The first step consists of the use of a dilute carbonate or bicarbonate solution for spraying the hot clinker to cool the same when taken from the kiln retorts or rotary roasters, and the second step consists in subjecting the green or freshly-ground Portland cement to the action of gases containing a large proportion of carbonic acid. Either step of this process of aging Portland cement may be used without the other, although in practice both steps of this process are desirable and supplemental to each other in producing a more completely aged or carbonated product than is possible by either step alone.

I will now describe in detail the specific manner in which my process of aging Portland cement may be practiced in one of the modern Portland-cement plants, although it is to be understood that by this specific description and reference to apparatus I do not wish to be limited to any particular mechanism or means for practicing my invention.

In the modern manufacture of Portland cement the prepared mixture of clay and limestone is first roasted to form the clinker or slag, which is afterward finely ground or powdered to form the complete cement.

An approved roasting apparatus for making Portland cement consists of a rotating sheet-iron cylinder which may be lined with fire-brick. The charge of the properly-mixed ingredients (clay and limestone) is introduced at one end of the rotating cylinder, and at the same time finely-powdered coal is blown in and mixed with the charge, so that the heat generated by burning the coal in the cylinder will form a clinker or slag. At the outlet end of the cylinder the clinker or slag may be discharged into conveying-buckets or other carriers.

The first step in practicing my invention is performed on the slag while in its heated or partly-molten condition, and this step consists in the use of a dilute carbonate or bicarbonate solution as a spray for cooling the heated clinker. In practice I have used a solution of ammonium bicarbonate, and I have found this reagent best for this purpose, as it will serve to a considerable degree to carbonate the free quicklime which may be contained in the clinker, and inasmuch as the ammonium is driven off or set free this will be done without adding to the slag either sodium, potassium, or other alkali, the presence of which is apt to modify the setting qualities of the cement. The slag or clinker which has just been cooled and in which the free quicklime has been partly carbonated is conveyed to the grinder in the ordinary manner and is finely powdered or ground producing a green or partly-aged Portland cement.

In a desirable form of plant for practicing my invention the green or partly-aged cement is carried away from the grinder by means of a worm or screw conveyer, and at this point in the manufacture the second step of the process may be practiced. This is done by introducing into the conveyer-casing a volume of gas containing a large percentage of carbonic acid.

In practice I have found that the desired percentage of carbonic acid may be obtained in gas taken from the boiler-stack or other chimney of the plant or from the kilns, and I have found it desirable to introduce this gas into the conveyer-casing, because the screw or worm of the conveyer forms, in effect, an agitator which will stir the green Portland cement, so that substantially the entire mass thereof will be exposed to the action of the gas.

If the conveyer which carries the cement away from the grinder is long enough, a complete aging of the cement may be secured while the cement is passing through the conveyer. If this cannot be secured, the process may be completed either by using a force-draft of stack-gases or other gas containing a large percentage of carbonic acid for blowing the cement into the bins or other storage-receptacles or else by the use of movable shelves which are arranged in a compartment and are mechanically actuated so that the cement will be passed down from one shelf to the succeeding shelf somewhat in a similar manner to that in which coal or other pulverized material is fed down in automatic stoking apparatus or in which slaked lime is treated with chlorin and by the admission of stack or other gases to this compartment to act upon the cement as thus agitated or exposed to action on said shelves.

In practicing this invention I am aware that numerous changes may be made in aging cement without departing from the scope of this invention as expressed in the claims. For example, many different ways may be devised for permitting the gases containing high percentages of carbonic acid to enter into and act thoroughly through a mass of freshly-ground or green cement, and I do not wish to be limited to details of operations which I have herein described, because, so far as I am advised, this invention is the first improvement in the art by means of which the time required for ordinary aging of Portland cement has been shortened—that is to say, in the art of manufacturing Portland cement as heretofore practiced the freshly-ground or green cement is usually conveyed or shoveled into bins to a depth of sixteen or eighteen inches and is kept there for six or eight weeks, or else the green cement after having been placed in barrels is kept in storehouses for still longer periods before it can be safely placed upon the market, whereas by practicing my invention the entire product of a Portland-cement plant can be put upon the market as soon as it is made.

Having thus fully described my improvement in the art of manufacturing Portland cement and the means by which the same may be practiced, what I claim as new, and desire to secure by Letters Patent of the United States, is—

1. The art of aging Portland cement which consists in spraying the heated clinker with a dilute carbonate or bicarbonate solution, and in afterward exposing the freshly-ground cement to the action of gases containing a large percentage of carbonic acid.

2. The improvement in the art of aging Portland cement which consists in spraying the heated clinker with a dilute solution of ammonium bicarbonate.

3. The improvement in the art of aging Portland cement which consists in spraying the heated clinker with a dilute solution of ammonium bicarbonate, and in the introduction of stack or kiln gases into the conveyer which carries the freshly-ground cement away from the grinding apparatus.

In testimony whereof I have hereunto set my hand in the presence of two subscribing witnesses.

WILLIAM O. EMERY.

Witnesses:
HOSEA H. RINTINE,
JAMES G. WEDDING.